June 24, 1930.  E. A. ILEMAN  1,766,997
PRESSURE GAUGE
Filed July 16, 1926  2 Sheets-Sheet 1
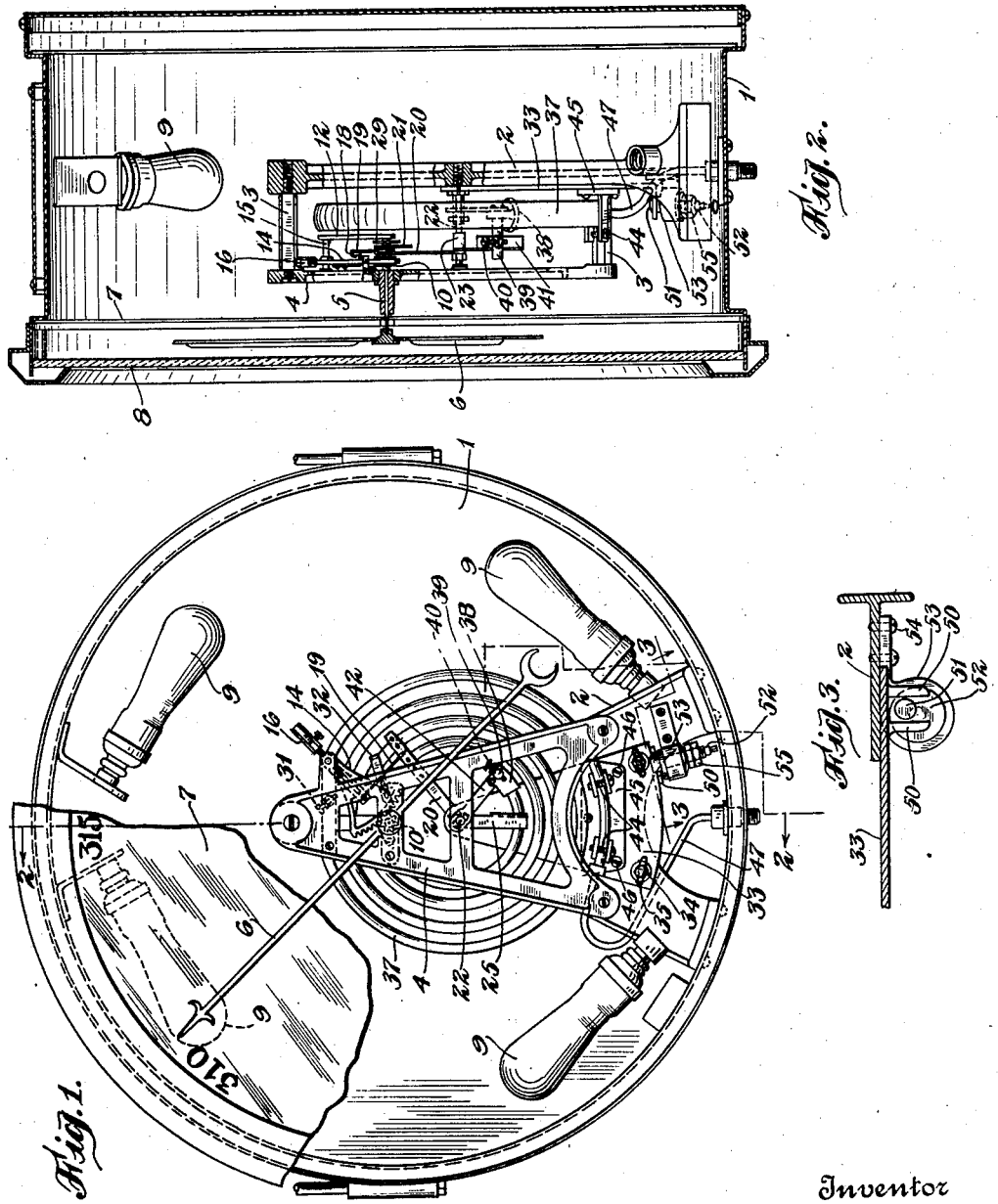
Inventor
Emil A. Ileman
By his Attorneys
Ward, Crosby & Smith June 24, 1930.  E. A. ILEMAN  1,766,997
PRESSURE GAUGE
Filed July 16, 1926  2 Sheets-Sheet 2

Inventor
Emil A. Ileman
By his Attorneys
Ward, Crosby & Smith

Patented June 24, 1930

1,766,997

UNITED STATES PATENT OFFICE

EMIL A. ILEMAN, OF NEW YORK, N. Y., ASSIGNOR, BY MESNE ASSIGNMENTS, TO CONSOLIDATED ASHCROFT HANCOCK COMPANY, INC., OF NEW YORK, N. Y., A CORPORATION OF DELAWARE

PRESSURE GAUGE

Application filed July 16, 1926. Serial No. 122,764.

My invention relates to improvements in pressure gauges and more particularly to pressure gauges that indicate only the upper portion of the range, i. e. where the lowest mark on the dial represents a pressure considerably above zero, although certain of the improvements may be found useful in other types of gauges.

The main object of the invention is to provide a gauge of the type described which is not only simple and efficient in operation and construction but also one in which the likelihood of damage thereto due to shocks during shipping etc. is substantially decreased or eliminated. Further and more specific objects, features and advantages will more clearly appear from the detail description given below taken in connection with the accompanying drawings which form a part of this specification.

Figure 5:
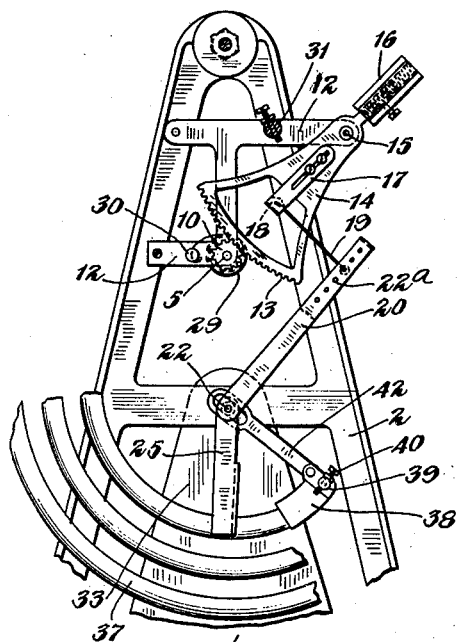
Figure 4:
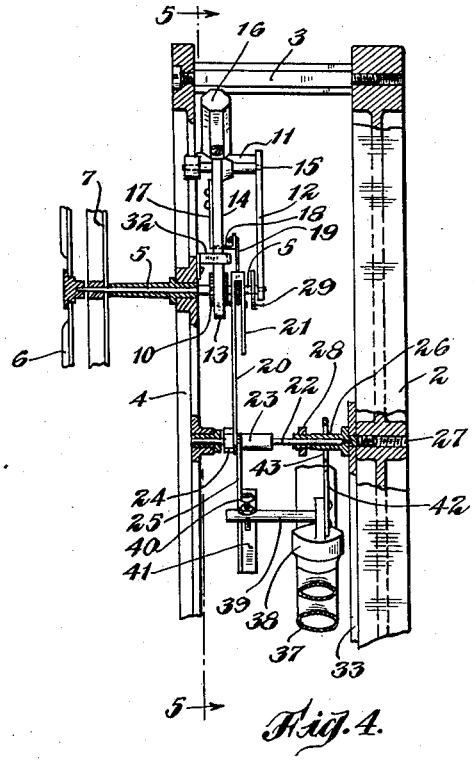
Figure 6:
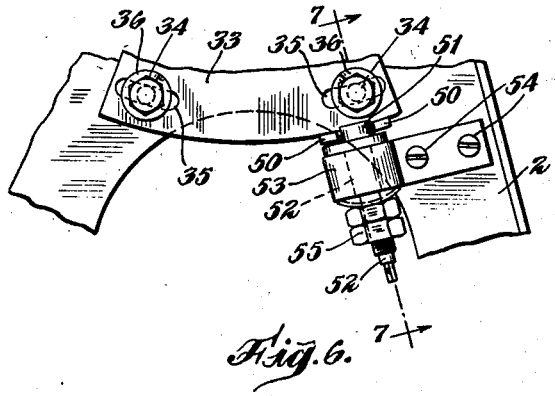
Figure 7:
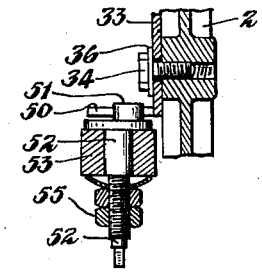

In the drawings, Fig. 1 is an elevation of a gauge embodying my improvements in a preferred form thereof, with certain parts broken away to better illustrate the interior mechanism. Fig. 2 is a section with some of the parts shown in section on the line 2—2 of Fig. 1. Fig. 3 is a detail section taken substantially on the line 3—3 of Fig. 1. Fig. 4 is a section showing certain details enlarged. Fig. 5 is a section showing details taken substantially on the line 5—5 of Fig. 4. Fig. 6 is an enlarged view of certain details shown in Fig. 1 and Fig. 7 is a section taken substantially on the line 7—7 of Fig. 6, or with the front frame member removed.

Referring to the drawings, 1 represents a circular casing in which is suitably fixed a rear frame member 2. Spaced in front of member 2 and secured thereto by spacing posts 3 is a front frame member 4. Journaled in the frame member 4 of the frame work is a spindle 5 adapted to carry an indicating pointer 6 in front of a translucent dial 7, a glass plate 8 being secured in front of the indicating pointer 6 in order to protect the same. Arranged within the casing are light bulbs 9 adapted to throw light through the dial 7 in order to illuminate the same so that the gauge is readily readable in the dark.

Secured to the frame member 4 by means of posts 11 is a movement frame member 12 in the lower part of which the spindle 5 is also journaled. The spindle 5 has secured thereto a small gear 10 adapted to be engaged and operated by an arcuate rack 13 carried by segment 14 which is pivoted in the frame work 12 at 15. The segment 14 is provided with an adjustable counterweight 16 and also has mounted thereon a plate 17 which is adjustable on the segment 14 toward and from the spindle 5 and in a plane passing through the spindle 5 and axis 15. The plate 17 is bent rearwardly at 18, and 19 represents a wire link having one end hooked into an aperture in the inner end of plate 17 and its other end pivotally connected to one arm 20 of a lever member. The said arm 20 is bent back upon itself as at 21, the end portion of the arm 20 being provided with a plurality of apertures 22ª through which a pin may be passed to pivotally secure the link 19 thereto in various positions at various distances from the point at which the arm 20 is pivoted.

22 represents another spindle having a boss 23 thereon and the opposite end of the arm 20 is rigidly but adjustably secured to the spindle 22 by means of a clamping nut 24 which clamps the end of the arm 20 toward boss 23. Between the end of the arm 20 and the boss 23 another lever arm 25 is clamped so that the arms 20 and 25 form a complete lever member, but upon loosening the nut 24 the angular relationship of the arms 20 and 25 may be adjusted as desired. The spindle 22 has one end journaled in the frame member 4 and its other end journaled in a sleeve 26 having a portion 27 screw-threaded into the frame member 2. At its opposite end the sleeve 26 is provided with a nut 28 screw-threaded thereon. A coil spring 29, one end of which is fastened to the spindle 5 and the other end of which is fastened to the frame member 12 at 30, serves to take up lost motion or back lash in the indicating movement. Adjustable stops are provided at 31 and 32, to limit the movement of the rack 14 in both directions so that the rack 13 cannot become disengaged from the gear 10 during handling, shipment or otherwise.

Pivotally mounted about the portion 27 of the sleeve 26 is a plate 33, which plate may be adjusted about the portion 27 as an axis and is held in adjusted position by means of bolts 34 passing through arcuate slots 35 in the plate 33, spring washers 36 being inserted between the heads of the bolts and plate 33 so that the plate 33 is frictionally held in adjusted position with respect to framework 2 but may be rotatably adjusted thereon by means hereinafter described.

37 represents a hollow coil spring having a plurality of turns. The inner end or free end of the spring is rigidly connected to the head 38, which has an arm 39 fixed thereto and which extends forwardly therefrom and through which arm there is screwed an adjustable screw 40, which when the coil spring is expanded so as to move the head 38 over an arcuate path will engage with the portion 41 of the lever arm 25 and so move it and lever arm 20 about the spindle 22 as an axis so that the lever arm 20 will operate the indicating movement to move the pointer 6. The head 38 also has rigidly secured thereto one end of an arm 42, the other end of which is slotted at 43, which slotted portion engages over the sleeve 26, so that while the inner end of the coil spring 37 is free to move axially in an arcuate path about the spindle 22 as an axis, it is nevertheless more or less supported at said axis by means of the arm 42, which engages over the sleeve 26 but is free to move axially as well as radially thereon without affecting the pointer. Its axial movement on the sleeve 26 is limited by a flange at one end and the nut 28 at the other end. The other end of the coil spring 37 is relatively fixed by being clamped by screws 44 between clamping members carried by a plate 45, which plate 45 is rigidly secured to the plate 33 by screws 46.

In assembling the apparatus, the plate 33 is placed in position so that bolts 34 are midway between the ends of the slots 35 and then the plate 45 with the spring 37 already clamped therein, is placed in position such that the axis of the arcuate path about which the inner end of the spring 37 will rotate when fluid pressure is applied to the interior of the spring, will coincide as near as possible with the axis of spindle 22. When this position is ascertained as above indicated the plate 45 is then securely fixed to the plate 33 with the spring clamped in this position. The fixed end of the coil spring is suitably connected to the source of fluid, the pressure of which is to be measured, by means of a flexible conduit 47.

Thus in operation when the fluid under pressure is applied to the spring 37 through the flexible conduit 47, the inner end of the coil spring at 38 will move over an arcuate path with the axis of the spindle 22 as an axis, but during the first part of this movement, the pointer will be maintained at the lower end of the scale on the dial by the action of spring 29 holding segment 14 against stop 31 and no movement of the indicating pointer will take place. However, after the spring has expanded to a certain extent corresponding to a predetermined pressure applied to the interior end of the spring, the screw 40 will engage lever arm 25 and thereupon further increases in the pressure applied will cause the spring 37 to further move the screw 40 in its arcuate path and so move the lever arm 25 to the left as viewed in Fig. 1, and thereby move the lever arm 20 and so operate the indicating movement to move the pointer 6 over the dial in a clockwise direction as viewed in Fig. 1. In this way the dial may be so arranged that the lowest mark on the dial represents a pressure considerably above zero and the indicating pointer will not move over the dial until a predetermined pressure has been reached. Thus for example, the dial may be made to read from 300 lbs. to 330 lbs. and the pointer will stand at 300 lbs. until the pressure applied reaches 300 lbs. and will then indicate the variations in pressure between 300 lbs. and 330 lbs. Such a type of gauge is used in power plants to indicate small variations in boiler pressure and in this way a large pointer movement is obtained with small variations in pressure, whereas if the gauge were to read from zero to 330 lbs. the pointer movement between 300 lbs. and 330 lbs. would be so small as to be difficult to read.

By using a long spring, that is, one having a plurality of turns a comparatively low and suitable ratio of multiplication is attained, and by mounting this spring so that it is supported at both ends, one by the fixed clamping means at 44 and the other by the arm 42, the spring is so supported that it is not readily strained or gotten out of order when subjected to shocks such as frequently occur in shipping, etc. Should the gauge be dropped or handled roughly in shipping or otherwise, there would be a tendency to distort or strain the spring and throw the inner or free end out of its proper position, but since this end of the spring is supported by the arm 42, this cannot occur. The slot at the inner end of the arm 42, however, permits a slight radial movement of the free end of the spring to accommodate for slight variations in the arcuate path over which the inner end of the spring moves. By adjusting the spring 37 so that the axis of the arcuate path over which the inner end of the spring moves coincides with the spindle 22 and the axis of the sleeve 26 substantially all friction between the inner end of the arm 42 and the sleeve 26 is avoided.

In order to provide means for adjustment of the plate 33 about its axis at 22, the plate is provided at its bottom with two forwardly extending lugs 50 between which extends a pin 51 eccentrically secured to a spindle member 52 journaled in a bracket 53 secured to the frame member 2 by means of screws 54, the spindle 52 being held in bracket 53 by nuts 55, a spring washer being inserted between the nuts 55 and the body portion of bracket 53. At its lower end the spindle 52 is provided with means adapted to fit a key which may be inserted through a hole in the casing to turn the spindle 52. By thus turning the spindle 52, the eccentric pin 51 is rotated so as to engage one or the other of the arms 50 and move the plate 33 slightly about its axis at 22. In this way the zero position of the gauge may be suitably adjusted. In order to adjust the point or predetermined pressure at which the coil spring 37 will begin to operate the pointer, the nut 24 may be loosened and the arm 25 moved about its axis with respect to the arm 20 and nearer or farther away from the screw 40 and after the arm 25 has thus been placed in the desired position, the nut 24 may be again tightened up in order to lock the lever arm members 20 and 25 together and on the spindle 22 in such adjusted position. Small adjustments for this purpose may be accomplished by adjusting the screw 40 in the arm 39. Also by releasing and tightening the nut 24 the position of the arm 20 with respect to the indicating movement may be suitably adjusted, and further adjustment to vary the amount of movement of the indicating pointer with respect to a given movement of the spring may be effected by adjusting the ends of the link 19 with respect to the axes at 15 and 22 respectively.

It will be noted that since the adjustment which may be accomplished by the eccentric pin 51 adjusts the fixed end of the spring about the axis 22, such adjustment does not in any way distort the spring or prevent the inner or free end of the spring from following the arcuate path, the axis of which is substantially coincident with the spindle 22, thereby keeping the axis of said arcuate path substantially coincident with the spindle 22 and sleeve 26 so that friction between the arm 42 and the sleeve 26 is substantially prevented while at the same time supporting the inner end of the spring 37 on the sleeve 26 so that shocks which the apparatus may receive in shipment or otherwise will not unduly strain or distort the spring.

While I have described my improvements in great detail and with respect to a preferred form thereof, I do not desire to be limited to such details since many changes and modifications may be made and the invention embodied in widely different forms and applied to different types of gauges without departing from the spirit and scope of the invention in its broader aspects. Hence I desire to cover all modifications and forms coming within the language or scope of any one or more of the appended claims.

What I claim as new and desire to secure by Letters Patent is:

1. A pressure gauge having in combination a frame work, a hollow coil spring to the interior of which fluid pressure is applied, a member mounted to swing about an axis passing centrally through the coils of the spring, one end of the spring being fixed to the framework and the other end of the spring being attached to said member, an indicating movement, a lever pivoted about said axis and connected to operate said indicating movement, and means connected with the movable end of the spring and adapted to operate said lever but only after the spring has been expanded to a certain extent by the application of a predetermined pressure thereto.

2. A pressure gauge having in combination a framework, a hollow coil spring to the interior of which fluid pressure is applied, a member pivoted about the axis of the spring, one end of the spring being fixed to the framework and the other end of the spring being fixed to said member, an indicating movement, a lever pivoted about said axis and connected to operate said indicating movement, and means connected with the movable end of the spring and adapted to operate said lever but only after the spring has been expanded to a certain extent by the application of a predetermined pressure thereto, said lever being made in two parts, the angular relation of which may be adjusted about said axis, one part being connected to said movement and the other part being adapted to be engaged by said lever operating means, whereby by adjusting the relationship of said two parts, the amount of expansion of the spring before it acts to operate the lever, may be adjusted.

3. A pressure gauge having in combination a framework, a hollow coil spring to the interior of which the fluid pressure is applied, one end of the spring being fixed to the framework, a member connected to the free end of the spring and arranged to turn about an axis substantially coincident with the axis of the spring, an indicating movement means whereby the indicating movement is operated by the other end of the spring, means whereby the spring acts to operate the indicating movement only after the spring has been expanded to a certain extent by the application of a predetermined pressure, and means for adjusting the point in the expansion of the spring at which it begins to operate the indicating movement.

4. A pressure gauge having in combination a framework, a hollow coil spring to the interior of which fluid pressure is applied, a member pivoted about the axis of the spring, one end of the spring being fixed to the framework and the other end of the spring being fixed to said member, an indicating movement, a lever pivoted about said axis and connected to operate said indicating movement, and means connected with the movable end of the spring and adapted to operate said lever but only after the spring has been expanded to a certain extent by the application of a predetermined pressure thereto, and means for adjusting the fixed end of the spring about its said axis.

5. A pressure gauge having in combination, a framework, a hollow spring, one end of which is fixed to the framework, and the other end of which is adapted to move over an arcuate path when fluid pressure is applied to the interior of the spring to expand the spring, a lever member, an indicating movement operated by said lever member, and means whereby the free end of the spring will operate said lever member but only after the spring has been expanded to a certain extent by the application of a predetermined pressure thereto, said lever being made in two parts the angular relation of which may be adjusted about said axis, one part being connected to said movement and the other part being adapted to be engaged by said lever operating means, whereby by adjusting the relationship of said two parts, the point in the expansion of the spring at which it acts to operate the lever, may be adjusted.

6. A pressure gauge having in combination, a framework, a hollow spring, one end of which is fixed to the framework, and the other end of which is adapted to move over an arcuate path when fluid pressure is applied to the interior of the spring to expand the spring, a lever member pivoted at the axis of said spring, an indicating movement operated by said lever member, and means whereby the free end of the spring will operate said lever member but only after the spring has been expanded to a certain extent by the application of a predetermined pressure thereto, means for adjusting the point in the expansion of the spring at which it acts to operate said lever and means for adjusting the fixed end of the spring about its axis.

7. A pressure gauge having in combination, a framework, a hollow spring, one end of which is fixed to the framework, and the other end of which is adapted to move over an arcuate path when fluid pressure is applied to the interior of the spring to expand the spring, a lever member pivoted at the axis of said spring, an indicating movement comprising a pointer, a gear for operating the same, and a pivoted rack member operating said gear, a link connecting said rack member with said lever and means whereby the free end of the spring will operate said lever member but only after the spring has been expanded to a certain extent by the application of a predetermined pressure thereto, and stops for limiting the movement of said rack member in both directions.

8. A pressure gauge having in combination, a framework, a hollow spring, one end of which is fixed to the framework, and the other end of which is adapted to move over an arcuate path when fluid pressure is applied to the interior of the spring to expand the spring, a lever member, an indicating movement comprising a pointer, a gear for operating the same, and a pivoted rack member operating said gear, a link connecting said rack member with said lever, and means whereby the free end of the spring will operate said lever member but only after the spring has been expanded to a certain extent by the application of a predetermined pressure thereto, said lever being made in two parts, the angular relation of which may be adjusted about the axis of the lever, one part being connected to said link and the other part being adapted to be engaged by said lever operating means, whereby by adjusting the relationship of said two parts, the amount of expansion of the spring before it acts to operate the lever, may be adjusted.

9. A pressure gauge having in combination, a framework, a hollow spring, one end of which is fixed, said spring having a free end which moves in an arcuate path when fluid pressure is applied to the interior of the spring to expand the spring, a lever member, an indicating movement operated by said lever member, and means whereby the free end of the spring will operate said lever member, and means for adjusting the relationship of the lever member with respect to the indicating movement, and stops for limiting the operation of the indicating movement in both directions.

10. A pressure gauge having in combination, a framework, a hollow spring, one end of which is fixed, said spring having a free end which moves in an arcuate path when fluid pressure is applied to the interior of the spring to expand the spring, a lever member operated by the free end of the spring, an arm secured to the free end of the spring and supporting the free end of the spring, said arm being pivoted about the axis of the spring, an indicating movement operated by said lever member, and means whereby the free end of the spring will operate said lever member.

11. A pressure gauge having in combination, a framework, a hollow spring, one end of which is fixed, said spring having a free end which moves in an arcuate path when fluid pressure is applied to the interior of the spring to expand the spring, a lever member, an arm secured to the free end of the spring and supporting the free end of the spring, said arm being pivoted about the axis of the spring, an indicating movement operated by said lever member, and means whereby the free end of the spring will operate said lever member, means for adjusting the fixed end of the spring in an arc concentric with the axis of the arcuate path of the free end of the spring, and stops for limiting the operation of the indicating movement in both directions.

12. A pressure gauge having in combination, a framework, a hollow spring, one end of which is fixed relatively to the framework and the other and free end of which moves in an arcuate path when fluid pressure is applied to the interior of the spring to expand the spring, a lever member pivoted about the axis of said spring, an indicating movement operated by said lever member, and means whereby the free end of the spring will operate said lever member, said lever member being made in two parts secured together and angularly adjustable with respect to one another, one part being connected to said movement and the other part being adapted to be engaged by said lever operating means.

In testimony whereof I have signed my name to this specification.

EMIL A. ILEMAN.